(12) United States Patent
Licari

(10) Patent No.: US 6,591,477 B1
(45) Date of Patent: Jul. 15, 2003

(54) METHOD FOR MAKING AN ARMATURE ASSEMBLY

(75) Inventor: James A. Licari, Mechesney Park, IL (US)

(73) Assignee: Warner Electric Technology, Inc., Richmond, VA (US)

(*) Notice: Subject to any disclaimer, the term of this patent is extended or adjusted under 35 U.S.C. 154(b) by 113 days.

(21) Appl. No.: 09/684,117

(22) Filed: Oct. 6, 2000

Related U.S. Application Data

(62) Division of application No. 09/032,572, filed on Feb. 27, 1998, now Pat. No. 6,194,803.

(51) Int. Cl.[7] .......................... H01F 7/06; F16D 27/00; F16D 27/12

(52) U.S. Cl. .......................... 29/602.1; 29/735; 29/736; 29/593; 29/598; 192/84.941; 192/84.961; 310/92; 310/51

(58) Field of Search ............................... 29/602.1, 596, 29/598, 732, 735, 593; 192/84.941, 84.961, 107 R, 200, 84.5; 310/92, 51; 335/279, 271

(56) References Cited

U.S. PATENT DOCUMENTS

| | | | |
|---|---|---|---|
| 4,493,407 A | 1/1985 | Newton | 192/84 C |
| 4,557,360 A | 12/1985 | Kumatani | 194/84 R |
| 4,657,124 A | 4/1987 | Flotow | 192/13 R |
| 4,796,728 A | 1/1989 | Kanengieter et al. | 188/18 A |
| 5,036,964 A | 8/1991 | Booth et al. | 192/84 C |
| 5,046,594 A * | 9/1991 | Kalinuma | 192/84 C |
| 5,119,915 A | 6/1992 | Nelson | 192/106.1 |
| 5,150,779 A | 9/1992 | Booth | 192/106.1 |
| 5,356,702 A | 10/1994 | Harrison | 428/236 |
| 5,365,388 A | 11/1994 | Maughan et al. | 360/99.04 |
| 5,370,209 A | 12/1994 | VanLaningham et al. | 192/106.1 |
| 5,372,228 A | 12/1994 | VanLaningham et al. | 192/84 C |
| 5,632,366 A | 5/1997 | Mullaney | 192/84.1 |
| 5,642,798 A | 7/1997 | Muirhead et al. | 192/84.961 |
| 6,194,803 B1 * | 2/2001 | Heim et al. | 310/92 |

FOREIGN PATENT DOCUMENTS

| | | |
|---|---|---|
| EP | 836026 A2 | 4/1998 |
| GB | 2339861 A * | 9/2000 |
| JP | 61-127928 | 6/1986 |
| JP | 9-68241 | 3/1997 |

* cited by examiner

*Primary Examiner*—Peter Vo
*Assistant Examiner*—Minh Trinh
(74) *Attorney, Agent, or Firm*—Dykema Gossett PLLC

(57) ABSTRACT

A method for making an armature assembly is provided that reduces the level of acoustic noise during initial engagement of the armature, during slippage, and during disengagement. The armature assembly includes an armature disc, an annulus of sound damping material, and a hub assembly having a flexible spider with a web portion. The armature assembly is made by first forming the annulus of sound damping material with a plurality of angularly spaced molding tabs. The annulus is affixed to the web portion of the hub assembly using the molding tabs and is then compressed by securing the armature disc to the web portion such that one side of the annulus is disposed against the web portion and a second side of the annulus is disposed against the armature disc.

9 Claims, 6 Drawing Sheets

METHOD FOR MAKING AN ARMATURE ASSEMBLY

This application is a divisional application of U.S. application Ser. No. 09/032,572, filed Feb. 27, 1998 which is U.S. Pat. No. 6,194,803, issued Feb. 27, 2001.

BACKGROUND OF THE INVENTION

This invention relates generally to an armature assembly for a selectively engagable and disengagable coupling such as an electromagnetic clutch or brake.

Newton U.S. Pat. No. 4,493,407, hereby incorporated by reference, discloses a typical electromagnetic clutch in which a slotted armature disc is connected to a driven hub by a mounting plate and is adapted to be attracted into engagement with a driving rotor when an electromagnet is energized. The armature disc is connected to the mounting plate by a series of leaf springs which couple the armature disc in the mounting plate for rotation in unison while allowing the armature disc to move toward and away from the rotor when the electromagnet is energized and de-energized.

Another type of armature assembly is disclosed in Booth U.S. Pat. No. 5,150,779, also hereby incorporated by reference. In that armature assembly, a resiliently yieldable plastic web acts to connect a low magnetic reluctance armature disc for rotation with the driven hub. The web flexes axially in order to permit the armature disc to move toward and away from the rotor when the clutch is engaged and disengaged.

One problem, however, is that impact noise is produced when the armature disc is initially snapped into engagement with the rotor. Noise is also produced by vibration which occurs during slippage of the armature disc and when the disc is disengaged from the rotor.

Van Laningham, et al., U.S. Pat. No. 5,372,228, also incorporated by reference discloses an electromagnetic clutch in which an annulus of sound damping material is sandwiched between an armature disc and a backing ring. The annulus and the backing ring coact to define a constrained-layer damping system for reducing noise when the armature disc is snapped into engagement with the rotor of the clutch and also during slipping and disengagement of the armature disc. However, this approach increases an axial length of the electromagnetic coupling, and the backing disc adds weight to the overall device.

Accordingly, there is a need to provide an improved electromagnetic coupling that minimizes or eliminates one or more of the problems as set forth above.

SUMMARY OF THE INVENTION

A general object of the present invention is to provide a new and improved armature assembly in which the level of noise produced by during initial engagement of the armature and during slippage and disengagement is reduced.

This and other objects are achieved by an armature assembly in which an annulus of sound damping material is sandwiched and compressed between the armature disc and a web portion of a hub assembly wherein the web portion is generally rigid but is axially movable relative to a hub of the hub assembly. The web serves as a constraining layer to cause sheer strains to develop in the damping material and to cause noise to be dissipated as a result of sheer deformation of the damping material.

The armature assembly of the present invention also has the advantage of having a reduced axial length relative to prior armature assemblies incorporating constrained-layer damping techniques. In addition, the armature assembly in accordance with the invention also has a reduced weight relative to prior armature assemblies incorporating constrained-layer damping techniques, since no backing plate is used.

These and other objects, features, and advantages of the present invention will become apparent to one skilled in the art from the following detailed description and accompanying drawings illustrating features of this invention by way of example, but not by way of limitation.

DETAILED DESCRIPTION OF THE PREFERRED EMBODIMENTS

Figure 1:
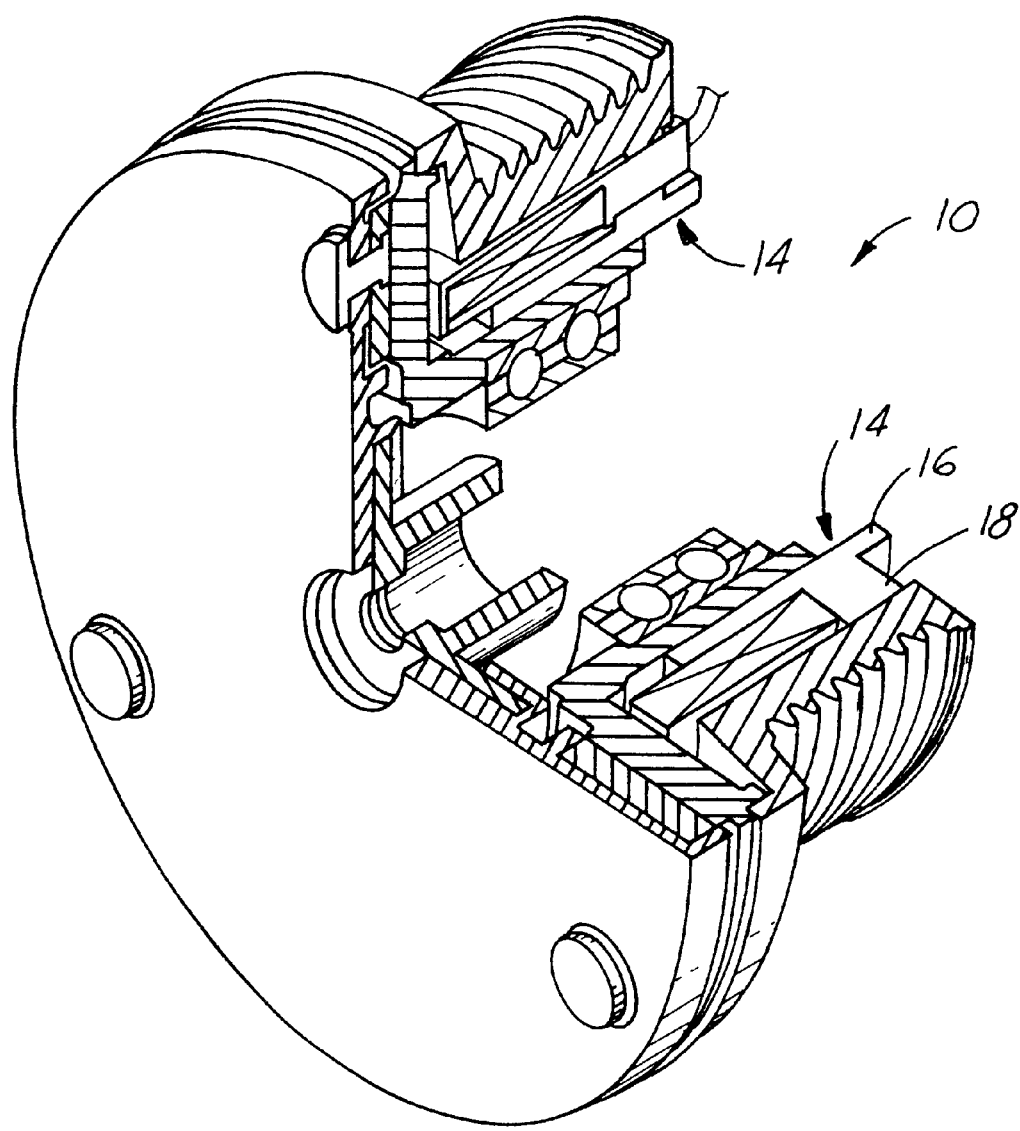
FIG. 1 is an enlarged perspective view, partially sectioned, of an electromagnetic coupling according to the present invention.

Referring now to the drawings wherein like reference numerals are used to identify identical components in the various views, FIG. 1 shows an electromagnetic coupling 10 which could be a brake, but which herein is in the form of an electromagnetic clutch 10.

Figure 2:
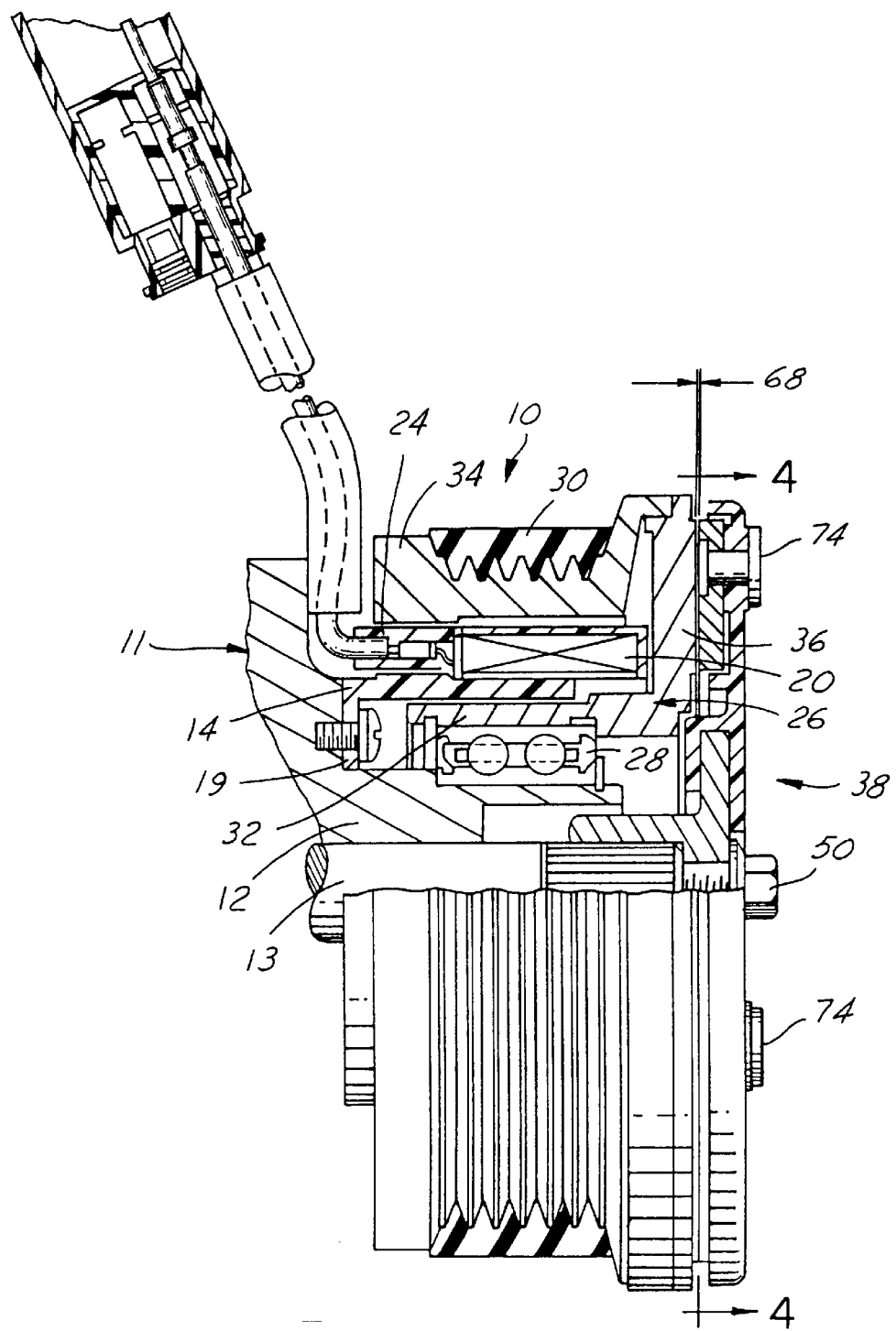
FIG. 2 is a partial section view taken substantially along lines 2—2 of FIG. 1 of an electromagnetic coupling having an armature assembly incorporating the unique features of the present invention.

FIG. 2 shows clutch 10 as being used in conjunction with an accessory drive, which may be an automobile supercharger unit 11 having an annular nose portion 12 for mounting the clutch and further having a drive shaft 13 which extends through the nose.

The clutch 10 includes an electromagnet which is formed in part by, preferably, a one-piece annular field shell 14, which is substantially L-shaped in radial cross-section and has an inner pole ring 16 and a radially outwardly extending pole leg 18 (best shown in FIG. 1). A field adapter 19 may also be provided for securing coupling 10 to the supercharger 11. A multiple turn winding 20 is secured within an annular winding casing 24. Pole leg 18 has a distal surface thereof that nearly extends to the inner surface of the rotor pulley (see description below) for the majority of the inner circumference of the rotor pulley (e.g., approximately a 0.5 mm gap in a constructed embodiment). However, the radial height of leg 18 is reduced through a predetermined sector of such circumference to permit entry of electrical conductors for winding 20. It should be appreciated that the foregoing structure is but one configuration which may be used with the inventive armature assembly. The armature assembly according to the present invention may be used with other rotor assemblies having differing configurations yet still employing an electromagnet. For example, reference may be made to Newton, et al., U.S. Pat. No. 4,160,498 for a detailed disclosure of an alternative electromagnet configuration.

An annular rotor 26 is rotatably journalled on the nose 12 of supercharger 11 by a bearing 28 and is adapted to be driven from an engine of the vehicle by an endless belt 30. The rotor 26 is substantially U-shaped in radial cross-section and includes inner and outer concentric annual pole pieces 32 and 34 made of steel having low magnetic reluctance, the inner pole piece being secured to the outer race of the bearing. Several axially spaced grooves extend circumferentially around the outer side of the outer pole piece 34 and interfit with complemental ribs on inner side of the drive belt 30. Accordingly, the outer pole piece defines a pulley for the belt 30.

The inner pole piece 32 of the rotor 26 is spaced inwardly of pole ring 16 of field shell 14 while the outer pole piece 34 of the rotor is spaced from the winding 20 and casing 24. When the winding 20 is excited by a voltage source, magnetic flux is produced and threads through the core and the rotor and across the various gaps between the pole rings and the pole pieces. The nature of the controlled flux transfer between the core and the rotor is well understood in the art, for example, as explained in more detail in the aforementioned Newton, et al. patent.

Connected to and extending between the pole pieces 32 and 34 of rotor 26 is an axially facing friction face 36 which is circumferentially slotted (not shown) in a conventional manner so as to define multiple magnetic poles. In a constructed embodiment, face 36 is formed with three radially spaced and circumferentially extending rows of angularly spaced slots. These slots are offset from the two radially spaced rows of slots of the armature disk. The slots cause the armature disc to have magnetic poles which coact with the poles of face 36 of rotor 26. When the winding 20 is energized, the friction face forms a rotatable magnetic field member.

Located in opposing relation to the rotor face 36 is an armature assembly 38. When the winding 20 is excited, magnetic flux draws part of the armature assembly into frictional engagement with the rotor face 36 so as to couple the armature assembly and the rotor for rotation in unison. Rotation of the armature assembly 38 is transmitted to the shaft 13 in order to drive the supercharger 11.

Figure 3:
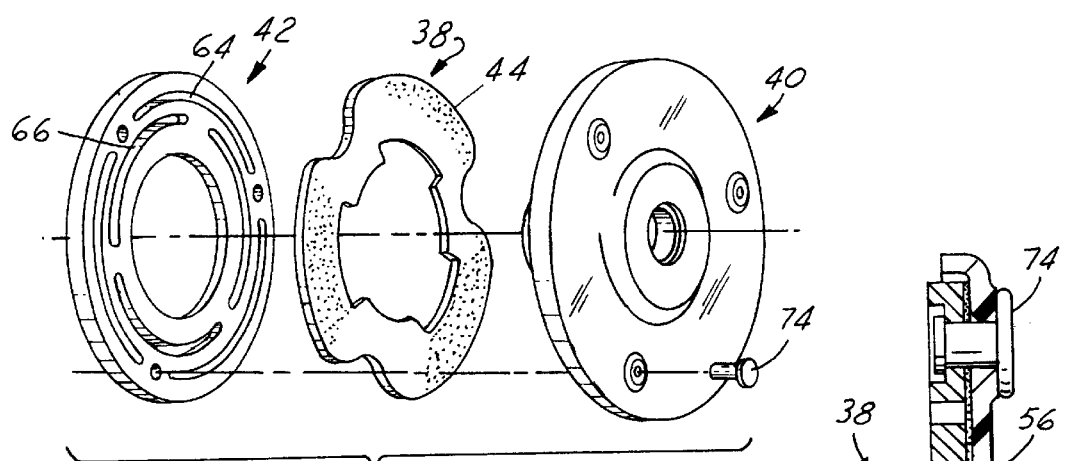
FIG. 3 is an exploded perspective view of the armature assembly.

FIG. 3 shows an exploded perspective view of an armature assembly 38 in accordance with the invention. As a general matter, the armature assembly 38 may be similar to that disclosed in Booth, U.S. Pat. No. 5,150,779, or similar to that disclosed in Van Laningham, et al., U.S. Pat. No. 5,372,228. However, as will be described hereinafter in detail, armature assembly 38 includes patentable improvements relative to both of the armature assemblies. Specifically, armature assembly 38 includes a hub assembly 40, armature disc 42, and an elastomeric annulus 44 of sound damping material disposed in compression between disc 42 and a web portion of hub assembly 40.

Figure 4:
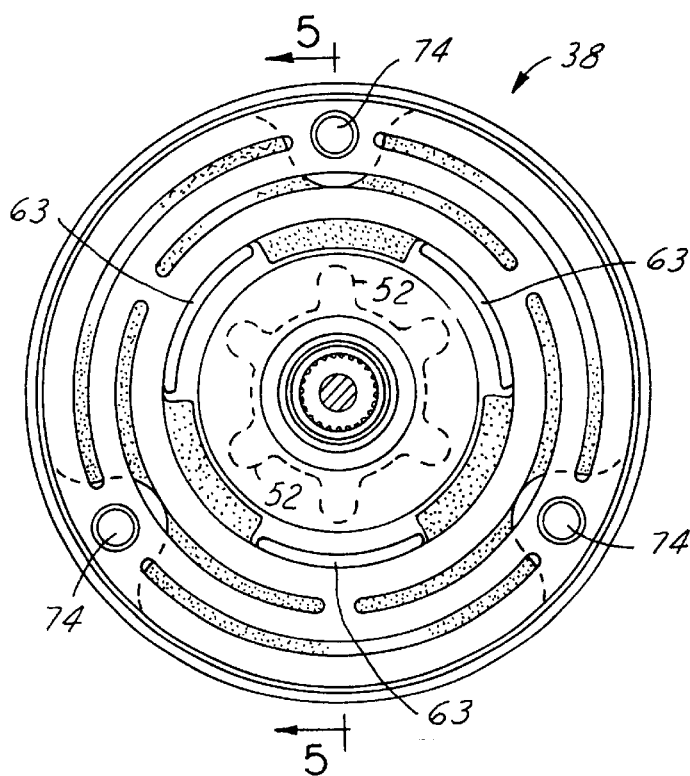
FIG. 4 is a cross-sectional view taken substantially along lines 4—4 of FIG. 2.
Figure 5:
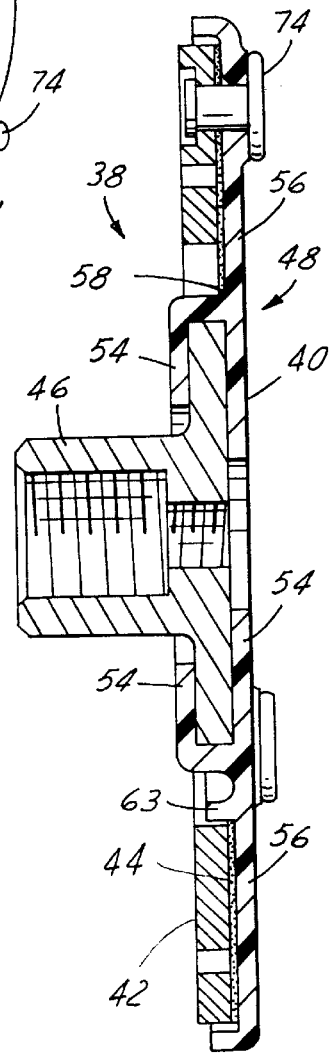
FIG. 5 is a cross-sectional view taken substantially along lines 5—5 of FIG. 4.
Figure 6:
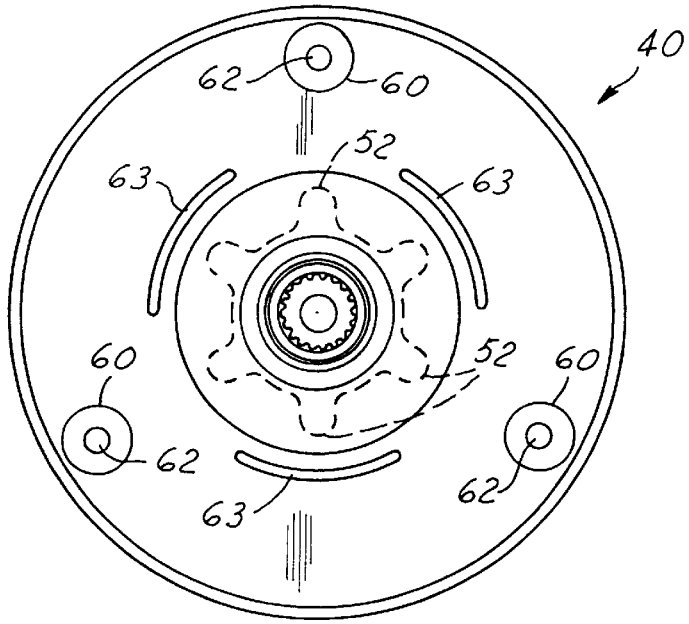
FIG. 6 is a side plan view of a hub assembly portion of the inventive armature assembly.

As shown in FIG. 4, and best shown in FIG. 5, the hub assembly 40 includes a tubular hub 46 having a central axis and a spider 48. Tubular hub 46 is preferably, but not necessarily, made of powdered metal, and is telescoped onto shaft 13 in an assembled state. In one embodiment, shaft 13 is provided with external involute spline teeth, while the inside diameter of hub 46 includes corresponding internal involute spline teeth wherein the hub may be splined to shaft 13. Hub 46 may be clamped in an axially fixed position on shaft 13 by a nut 50 (shown best in FIG. 2), which is threaded onto a free end portion of shaft 13. As shown in FIG. 6, hub 46 is formed with radially extending and angularly spaced lugs 52 for a purpose to be described hereinafter.

Spider 48 may be injection molded of resiliently yieldable material, such as plastic. A suitable material for the spider may be DuPont ZYTEL® 8018HS BKB085 or equivalents thereof.

As shown in FIG. 5, spider 48 includes a central sleeve 54 which encircles a forward end portion of hub 46. The hub 46 preferably is insert molded in place when the spider is molded and thus the plastic of the sleeve 54 is bonded to and encapsulates the outer end portion of the hub. Lugs 52 function to couple the sleeve 54 and the hub 46 for rotation in unison. That is, when the spider 48 is molded, the plastic flows into and fills the space between the lugs 52 and thus prevents relative rotation between the hub 46 and the sleeve 54. Each lug 52 also defines two shoulders which face in opposite axial directions and which are engaged by the plastic of sleeve 54 to captivate the sleeve 54 axially on hub 46. Reference may be made to Booth, et al., U.S. Pat. No. 5,036,964 for a more detailed disclosure of lugs 52.

Spider 48 further includes a web portion 56 molded integrally with and extending radially from sleeve 54. The web 56 is preferably circular and is comparatively thin in the axial direction. Because the plastic is relatively flexible, the web portion 56 is capable of flexing axially relative to sleeve 54 at a living hinge, designated 58 in FIG. 5, defined at the junction of web 56 with sleeve 54.

Figure 7:
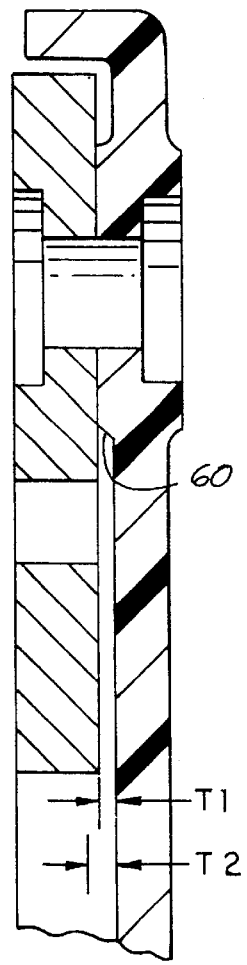
FIG. 7 is an enlarged view of a portion of the armature assembly shown in FIG. 5.

As shown in FIGS. 6 and 7, spider 48 is molded with three angularly spaced pads or bosses 60. Pads 60 are formed integral with the rear side of web 56 and are adjacent holes 62 formed in spider 48. As shown in FIG. 7, pads 60 project axially rearwardly from the rear side of web 56 and engage the forward side of armature disc 42 at three angularly spaced locations adjacent the outer periphery of the disc. A nominal axial gap, indicated at $T_1$, is formed between web 56 and armature disc 42, which may be approximately 0.023 inches (+0.005, −0.004 inches) in a constructed embodiment. It is understood that other gaps and thickness may be applicable when appropriate compression of the annulus is obtained. In addition, as best shown in FIG. 6, spider 48 may also be formed with three angularly spaced, rearwardly projecting tabs 63. The purpose of tabs 63 will be described in detail hereinafter.

As shown in FIG. 3, armature disc 42 may be formed of low magnetic reluctance material, such as AISI 1010 steel. Armature disc 42 may further be formed with two radially spaced and circumferentially extending rows 64 and 66 of angularly spaced slots. The slots cause the armature disc 42 to have magnetic poles which (coaxial) with the poles of face 36 of rotor 26. When winding 20 is de-energized (i.e., in a de-energized state), a narrow axial air gap 68 (FIG. 2) exists between the pole faces of rotor 26 and the pole faces of armature disc 42. This gap may be about 0.33 mm in a constructed embodiment. Upon energization of winding 20, magnetic flux cuts across gap 68, threading back and forth through the poles of the friction face 36 and armature disc 42 in a conventional and well known manner, to draw armature disc 42 into frictional engagement with the rotor to thereby couple the armature disc for rotation in unison with rotor 26.

Impact noise may be produced when the steel armature disc 42 is snapped into engagement with the steel rotor 26. Noise is also produced during slippage and disengagement of armature disc 42. In accordance with the present invention, such noise is reduced by constructing the outer peripheral portion of armature assembly 38 as a constrained-layer damping sandwich containing sound damping material.

Figure 8:
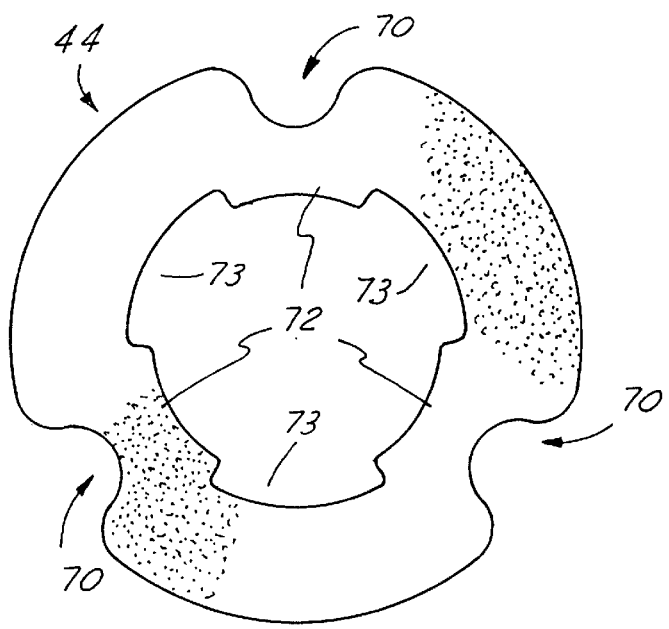
FIG. 8 is an end view of a first preferred embodiment of an annulus of sound damping material.

Particularly, and now with reference to FIG. 8, an elastomeric annulus 44 of sound damping material is included in armature assembly 38 to minimize noise. In a first preferred embodiment shown in FIG. 8, annulus 44 may, but does not necessarily, comprise compressible sound damping material. This material may comprise a silicone composite cast with strands of reinforcing fiber, preferably a fiberglass mesh, and which may be commercially available from Rogers Corporation, Elk Grove Village, Ill., under the trade designation PORON® HT 1500. "Mesh" may mean strands of fiber interwoven in manner similar to, for example, clothing, or may mean merely that the strands of fiber in some manner lend support to each other. In the first preferred embodiment, the following properties of elastomeric annulus 44 apply:

| ITEM | VALUE | PER |
|---|---|---|
| Durometer (Shore "A") excluding mesh | 40–75 preferably 65–75 most preferably 75 | ASTM D-2240 |
| Breaking Strength Warp | 250 Min PPI | ASTM D-751 |
| Compression Set | 35% Max | ASTM D-395 Method B |
| Temperature Range | −65° F. to +400° F. | |

Annulus 44 is preferably die-cut from sheet material (e.g., sheet material PORON® HT-1500). In an alternate method of manufacture, annulus 44 may be molded, working from stock silicone having the above-identified parameters, and strands of fiber, preferably in a mesh form, and more preferably a fiberglass mesh. It should be understood, however, that other types of fibers and/or meshes, such as those formed from polyester material, or no fibers at all, may be suitable depending on the strength needed for any particular application of coupling 10. For example, omitting strands of fiber altogether from annulus 44 (i.e., an annulus principally of silicone of the specified durometer) may be suitable provided the continuous speed of rotation of armature assembly 38 is not expected to exceed 6,000–7,000 rpm.

The first preferred embodiment of annulus 44 includes three angularly spaced notches 70, corresponding in size and shape to accommodate the three pads 60. In addition, annulus 44 may be formed to include three angularly spaced tongues 72 which form three corresponding slots 73 therebetween. The tongues 72 are adapted in size and shape so that a respective one of the arcuate tabs 63 may be received in a respective one of slots 73 between the tongues 72.

The annulus 44 is preferably sandwiched between armature disc 42 and web 56, which defines the constraining layer for the sound damping material. Annulus 44 is preferably held in compression between armature disc 42 and web 56 after assembly of armature assembly 38 is completed. As shown in FIG. 7, the nominal gap between armature disc 42 and web 56 may be approximately $T_1$. The thickness of annulus 44 is selected to be greater than the nominal gap, such thickness being diagrammatically illustrated at $T_2$. Sound damping annulus 44 is held in compression between disc 42 and web 56 by means, such as rivets 74, for securing armature disc 42 and spider 48 to each other. It should be understood that other means, such as bolts, screws, pins, moldings or the like may also be used with the same effect. Rivets 74 are conventional, having shanks which extend through axially aligned holes in web 56 and disc 42. The heads of the rivets are located adjacent the forward face of web 56 while the swaged ends of the rivets are received in counter-bores formed in the working face of armature disc 42. In a constructed embodiment, the counter-bores have been omitted. When the rivets are swaged, the damping annulus 44 is compressed between armature disc 42 and web 56. In a constructed embodiment, gap $T_1$ is nominally 0.023 inches, while annulus 44 is nominally 0.031 inches thick, thus ensuring that annulus 44 is compressed when assembled. The sound damping effectiveness is reduced if annulus 44 is not held in compression.

EXAMPLE 1

The sound damping annulus 44, in a constructed embodiment, was approximately 0.031 inches (+/−0.005 inches) in thickness (uncompressed) die cut from Rogers PORON HT-1500 reinforced silicone rubber having the following specified properties: Durometer=75 (Shore "A"); Breaking Strength=250 pounds per inch (ppi); Tear Strength=70 ppi; Compression Set=35% maximum; weight loss <1%; Time before "Weeping" Occurs=24 hours minimum; and, resistance to radiant heat to 500 F. The shape configuration was substantially as shown in FIG. 8. The coupling containing this armature assembly having the constructed annulus 44 satisfied the following criteria without loss of compression in the annulus 44, thus maintaining its effectiveness at noise damping:

(i) 13,500 rpm at 250° F. for two (2) hours; and, (ii) A cyling test from 12,250 to 4,000 rpm at 250° F. for 509 hours.

EXAMPLE 2

A second constructed embodiment was approximately 0.031 inches (+/−0.005 inches) in thickness (uncompressed), which was molded and comprised silicone material having a durometer between about 40–60 (Shore "A"), and which included a polyester mesh having a loose weave (e.g., strands approximately 1/16 inch apart, viz., 16 strands per inch). The strands were formed in a cris-cross mesh having one set of strands (all parallel to each other) intersecting a second set of strands (all parallel to each other) at about a 45 degree angle. The shape of this configuration was similar to that shown in FIG. 8, but without the tongues 72 formed on an inner diameter thereof. The armature assembly having this constructed annulus of damping material was shown to be effective in reducing noise up to about 10,000 rpm.

An armature assembly 38 according to the present invention improves upon the armature assembly disclosed in U.S. Pat. No. 5,372,228, inasmuch as it is more axially compact, and, by not requiring a backing plate of steel as disclosed in that patent, may be lighter. In addition, the added strength provided by the reinforcing strands of fiber included in annulus 44 permit (i) the radially rigid, but axially flexing web 56 to act as a constraining layer in a constrained-layer damping system and, (ii) very high rotational speeds while maintaining compression of the annulus 44.

Figure 9:
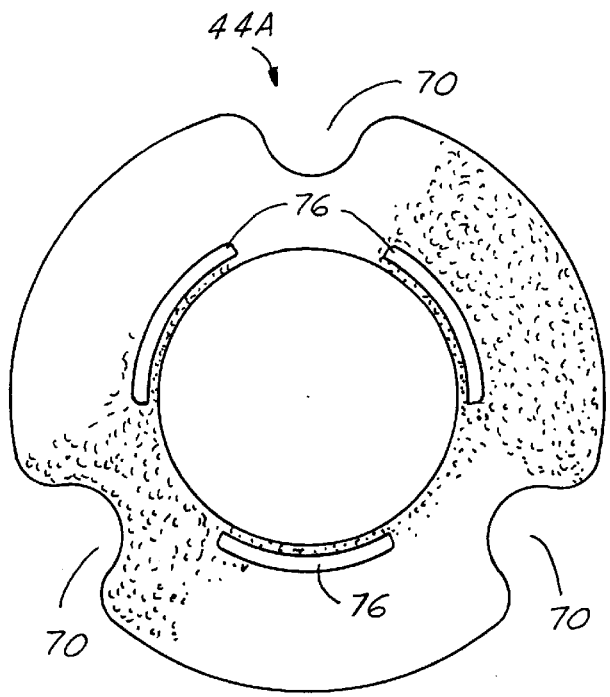
FIG. 9 shows a second preferred embodiment of the annulus of sound damping material.

FIG. 9 shows a second preferred embodiment, designated annulus 44A, which includes three angularly spaced arcuate grooves 76 that correspond in size and shape to the three angularly spaced arcuate tabs 63. The annulus 44A thus includes the ability to be self-aligning, locking in place independent of armature disc clamping forces. In addition, the radial cross-section is increased in this embodiment, which improves burst strength without (i) increasing axial thickness, and (ii) without a significant increase in the spring rate of the assembly. In addition, the positive alignment provided by the arcuate tabs 63 in combination with the arcuate grooves 76 keeps the annulus 44A off of pads or bosses 60 during assembly.

Figure 10:
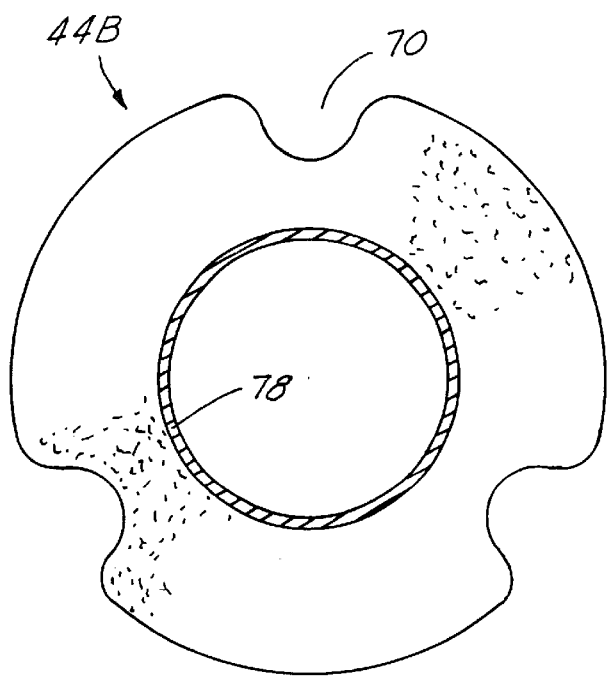
FIG. 10 is a third preferred embodiment of the annulus of sound damping material.

FIG. 10 shows a third preferred embodiment, namely sound damping annulus 44B. Radial forces during operation of coupling 10, particularly due to high rotation speeds of armature assembly 38, may cause the inside diameter, and outside diameter of the annulus to expand radially outwardly. To the extent that the annulus thins due to the radial forces, such thinning may cause a loss of compression in the annulus, which in turn reduces the effectiveness of annulus 44 as an acoustic damper. To reduce the effects of centrifugal forces, the third embodiment 44B includes a ring 78 molded or otherwise attached to the inside diameter (or alternatively, to the outside diameter—not shown) of the annulus 44B. The ring reinforces the annulus 44B to resist radial forces, and therefore resists or opposes the "thinning" of the annulus 44B during high speed rotation. Compression is therefore maintained.

Figure 11:
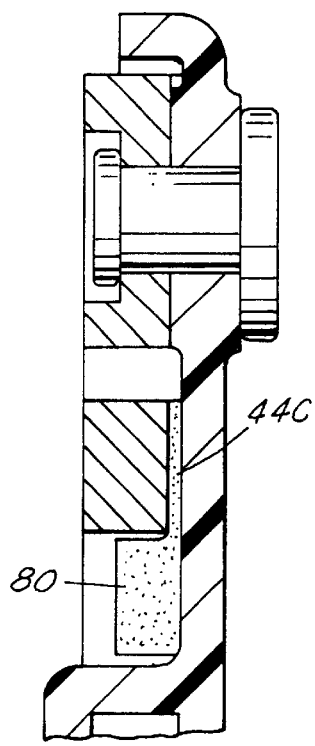
FIGS. 11 and 12 show fourth and fifth preferred embodiments of the annulus of sound damping material.
Figure 12:
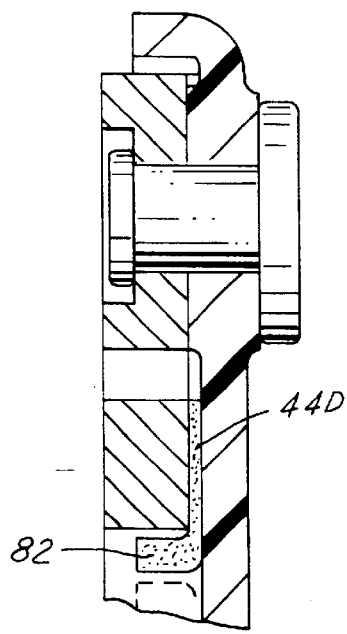

FIGS. 11 and 12 illustrate fourth and fifth preferred embodiments of annulus 44, namely annulus 44C and annulus 44D, respectively. Annulus 44C is molded with a relatively thick leg 80 on an inside diameter thereof. In this embodiment, hub assembly 40, particularly spider 48, is formed without arcuate tabs 63. In effect, the thick inner molded leg 80 replaces the function of the arcuate tabs 63. The structure of the annulus 44C itself increases burst strength without increasing axial thickness and without increasing the spring rate of the assembly.

The annulus 44D shown in FIG. 12 is similar to the annulus 44C shown in FIG. 11, but is formed with a relatively thin leg 82 formed on an inside diameter thereof. In this embodiment, the three arcuate tabs 63 extend into one another to form a continuous circular rib, the thin leg 82 being sized to fit between the rib and the inside diameter of armature disc 42 when assembled. As with the embodiment shown in FIG. 11, annulus 44D is strengthened without an increase in axial length or an increase in the axial package and, in addition, the molded leg 82 restrains the annulus 44D from high RPM extrusion, which could result in a loss of compression, and thus acoustic damping effectiveness.

Figure 13:
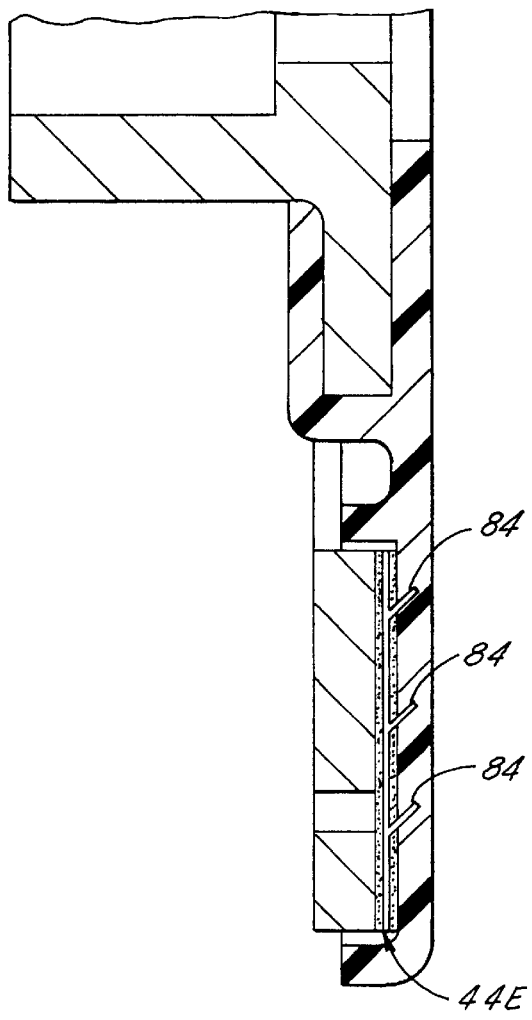
FIG. 13 shows a sixth preferred embodiment of the annulus of sound damping material incorporating molding mesh tabs.

FIG. 13 shows yet another, sixth preferred embodiment of annulus 44, namely 44E. In this embodiment, molding mesh tabs, designated at 84, are formed when annulus 44E is made. That is, annulus 44E is molded so that mesh tabs, for example, of fiberglass mesh, extend beyond the surface of the annulus itself. Annulus 44E permits an improved method of manufacturing an armature assembly. In particular, the annulus 44E, thus formed with molding mesh tabs, may be positioned into an injection mold cavity where the spider 48 is molded to tubular hub 46. The plastic (i.e., the material of which spider 48 is formed) will flow around the extended tabs 84, thus securing the annulus 44E into the hub assembly 40, particularly to web 56 of spider 48. This sub-assembly comprising hub 46, spider 48, and sound damping annulus 44E, can then be loaded, for example, into a riveting station and secured to armature disc 42 without slowing down manufacturing throughput. As a further advantage, the annulus 44E of sound dampening material will remain in the correct angular orientation during assembly, and thereafter. The foregoing embodiment enables a simplification of the assembly process, and further ensures correct positioning of the sound damping annulus 44E during manufacturing, as well as minimizing the slow-down associated with orienting the annulus 44 to the hub assembly 40.

Figure 14:
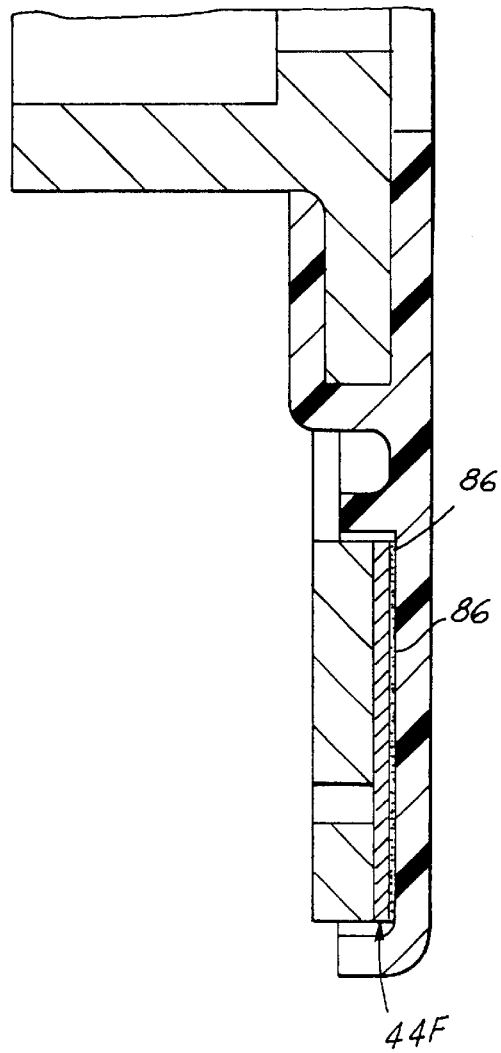
FIG. 14 shows a seventh preferred embodiment of the annulus of sound damping material having adhesive integral with an outward surface of the annulus.

FIG. 14 illustrates a further embodiment of annulus 44, namely annulus 44F, having a layer of adhesive 86 on one side thereof. This embodiment also permits an improved method of manufacturing an armature assembly, wherein the annulus 44F is positioned with the adhesive side facing the inward side of the spider 48. It should be understood that the adhesive can also be applied to the armature side of annulus 44E (not shown). Also, the adhesive may be applied to spider 48 and/or armature 42 to the same effect. Again, this sub-assembly can then be loaded into, for example, a riveting station and secured to armature disc 42 without slowing or reducing throughput. Again, the annulus 44F will be maintained in a correct and desired angular position relative to the spider of hub assembly 40 for assembly.

While the invention has been particularly shown and described with reference to the preferred embodiments thereof, it is well understood by those of ordinary skill in the art that various changes and modifications can be made in the invention without departing from the spirit and scope thereof, which is limited only by the appended claims.

What is claimed is:

1. A method of making an armature assembly including an armature disc, an annulus of sound damping material, and a hub assembly having a web portion, said method comprising the steps of:

(A) forming said annulus of sound damping material with integral attachment means;

(B) affixing said annulus to said web portion of said hub assembly using said attachment means so that a first side of said annulus is disposed against said web portion of said hub assembly;

(C) compressing said annulus by securing said armature disc to said web portion of said hub assembly so that a second side of said annulus, opposite said first side, is disposed against said armature disc.

2. The method of claim 1 wherein step (A) is performed by the substeps of:

forming one of a polyester mesh and a fiberglass mesh having molding tabs projecting therefrom defining said attachment means;

disposing said one mesh in a first mold;

introducing an elastomeric material into said first mold to thereby form said annulus.

3. The method of claim 2 wherein step (B) is performed by the substeps of:

disposing said annulus into a second mold configured to produce said hub assembly so that the molding tabs extend into a region of the second mold for forming the web portion;

introducing plastic into said second mold to form said hub assembly wherein the molding tabs secure the annulus to the web portion.

4. The method of claim 1 wherein step (A) is performed by the substeps of:
  applying an adhesive defining said attachment means to one side of said annulus.

5. The method of claim 4 wherein step (B) is performed by the substeps of:
  positioning said annulus in a desired angular orientation relative to said web portion with said adhesive side toward said web portion;
  applying a contact force to a side of said annulus opposite said adhesive side to fix said annulus to one of said web portion and said armature.

6. The method of claim 1 wherein said annulus includes elastomeric material and strands of fiberglass material.

7. The method of claim 6 wherein said strands of fiberglass material form a fiberglass mesh.

8. The method of claim 6 wherein said attachment means comprises a plurality of angularly spaced tongues defining a plurality of angularly spaced slots.

9. The method of claim 8 wherein said web portion includes a plurality of angularly spaced tabs and said plurality of angularly spaced slots are sized to respectively accommodate said plurality of angularly spaced tabs.

* * * * *